July 22, 1958   G. RAPP   2,844,774
ELECTRICAL FOLLOW-UP SYSTEM
Filed Aug. 2, 1954   3 Sheets-Sheet 3
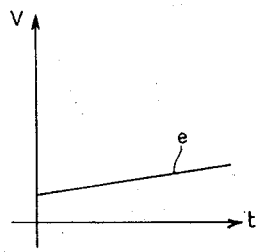
FIG. 3$_a$
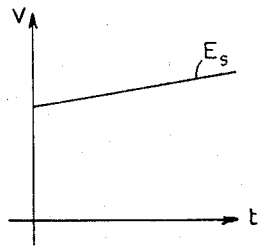
FIG. 3$_b$
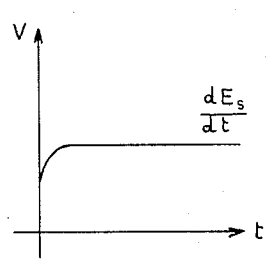
FIG. 3$_c$
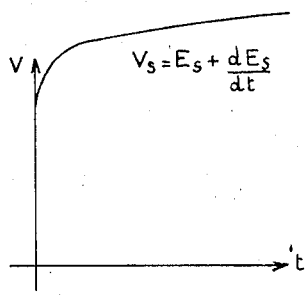
FIG. 3$_d$
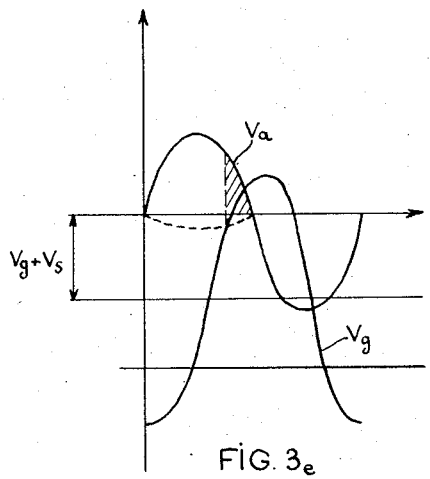
FIG. 3$_e$
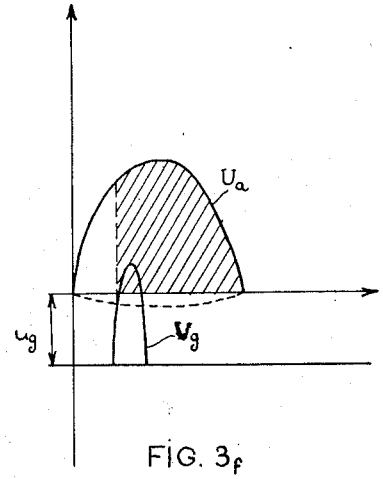
FIG. 3$_f$
INVENTOR:
GEORGES RAPP
BY: *Moore of Hall*
ATTORNEYS

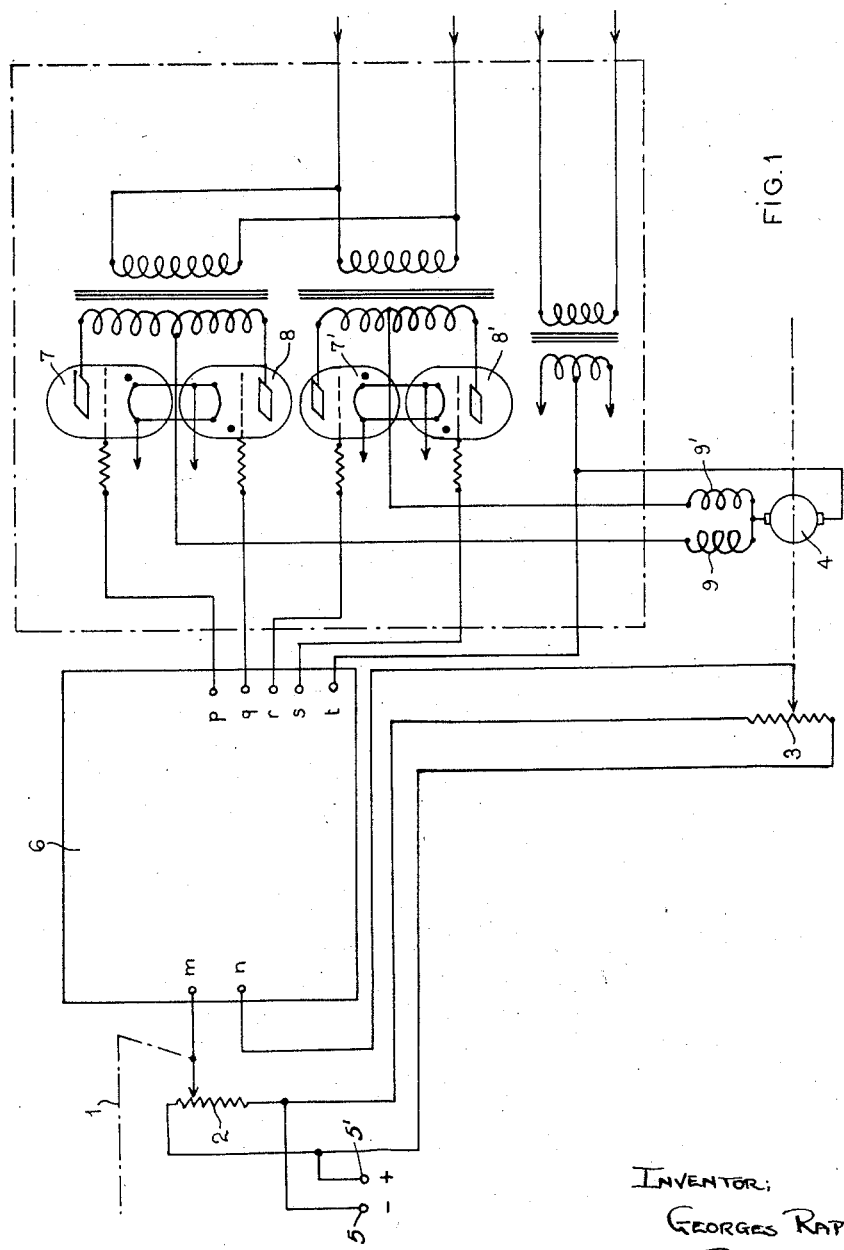

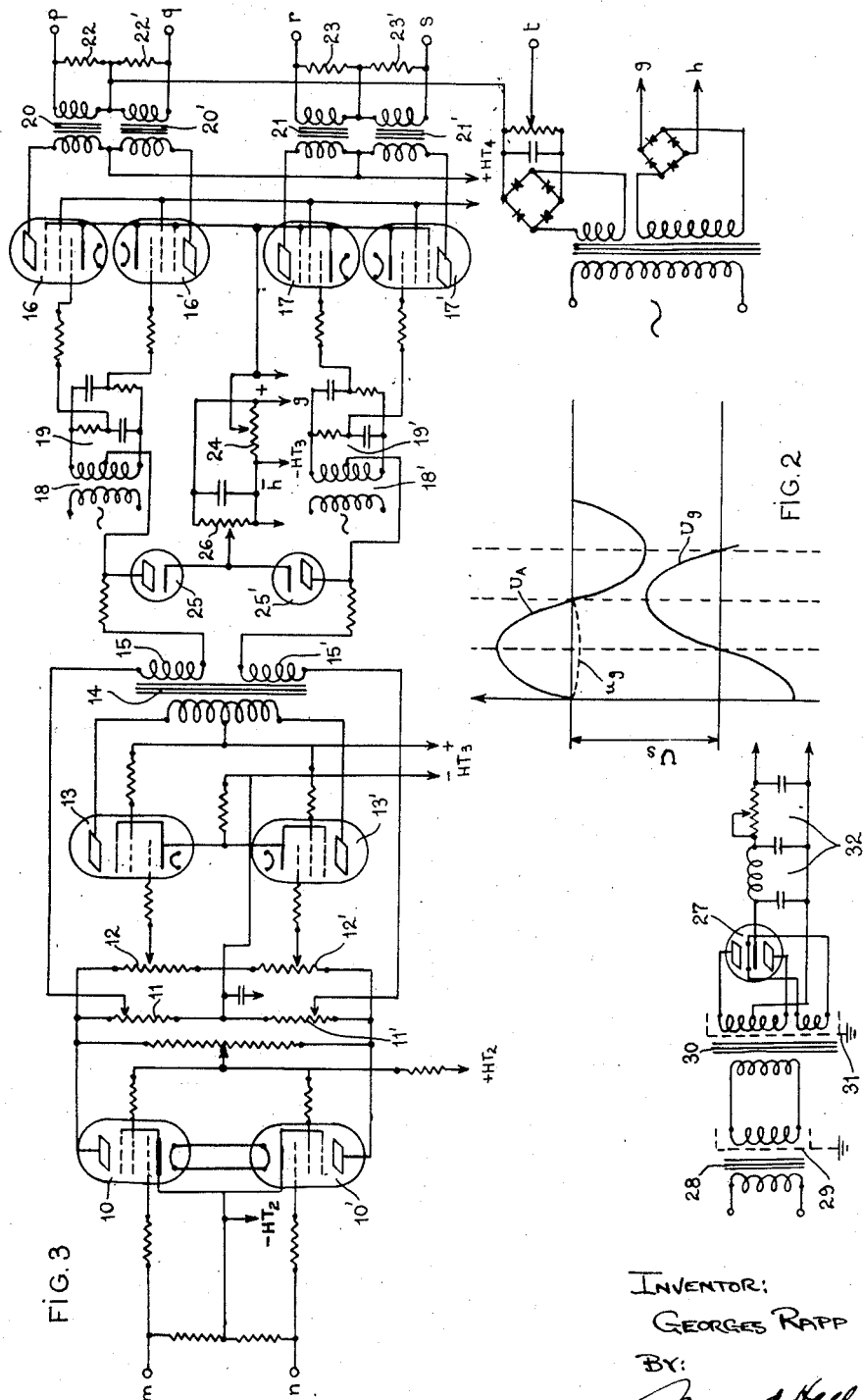

United States Patent Office 2,844,774
Patented July 22, 1958

2,844,774

ELECTRICAL FOLLOW-UP SYSTEM

Georges Rapp, Malakoff, France, assignor to Society Sirelec, Issy-les-Moulineaux, France, a corporation of France Application August 2, 1954, Serial No. 447,100

Claims priority, application France June 30, 1954

6 Claims. (Cl. 318—29)

The present invention relates to an electric follow-up system allowing the reproduction with great accuracy, without any delay and without so-called "hunting" oscillations, of the motions of a control member by a servo-member the driving of which requires appreciable power. As one example, the present invention may be employed in conjunction with a training cabin for an airplane or a helicopter in which the pitching and rolling oscillations are to follow accurately the motions of a member controlled by a flight simulating device. Of course this example is not restrictive and the servo-device according to the invention applies as well to many other cases.

The present invention will be more fully understood from the following description and accompanying drawings, in which:

Figure 1 is a schematic illustration of one form of servo-device or follow-up system constructed in accordance with the present invention.

Figure 2 is a waveform diagram illustrating the operation of certain thyratrons employed in the invention.

Figure 3 is a more detailed schematic diagram of a portion of the circuit shown in Figure 1.

Figures 3a through 3f are waveform diagrams illustrating the operation of the circuit shown in Figure 3; and Figure 4 is a schematic diagram illustrating the supply circuits of certain portions of the overall arrangement.

One already knows servo-devices of the type diagrammatically illustrated in Fig. 1 of the annexed drawing, in which a control member (not shown) actuates, through a mechanical connection (diagrammatically illustrated by the dash and dotted line 1) the slider of a potentiometer 2 mounted in parallel with an identical potentiometer 3 the slider of which is controlled by a motor 4 driving the servo-device, both potentiometers being supplied at points 5, 5' with a direct voltage. The difference of potential existing at any moment between the two sliders translates the actual difference between the position of the control device and the position of the servo-device into an error signal, and this error signal is used, after being amplified in an amplifier 6, to actuate the grids of two groups of thyratrons mounted as double wave rectifiers 7, 8 and 7', 8' and respectively supplying the two windings 9, 9' of the split field motor 4 so as to rotate it either in one direction or the other according to the sign of difference to be corrected, i. e. according to the polarity of the error voltage or signal existing between the sliders of the potentiometers 2 and 3.

For the control of the grids of the thyratrons, the amplified direct voltage of the error signal is not used directly but, instead, impulses are used, the instant of starting of which in relation to the alternating voltage supplying the anodes of the thyratrons of which is controlled by this error signal. If $U_A$ (Fig. 2) is the alternating voltage applied to the anode of a typical one of said thyratrons and $u_g$ the minimum grid bias necessary to make said thyratron a live conductive, it is clear, that, when an alternating voltage $U_g$ is applied to the grid of said thyratron, the thyratron will be conductive during those parts of the cycles in which the voltage $U_g$ passes beyond the threshold of starting illustrated by the line $u_g$; and the duration of the passage of the current during each cycle, hence the mean voltage supplying the motor of the servo-device, will depend on the phase shift between $U_A$ and $U_g$. To render this phase-shift a function of the error signal, the alternating voltage $U_g$, preferably phase shifted through 90° with respect to $U_A$, and the conti-direct voltage $U_S$ resulting from the amplification of the error signal are simultaneously applied to the grids of the thyratrons. Consequently a voltage is applied to the grid which will pass beyond the limit voltage $u_g$ at moments and for durations which are a function of the value of the continuous voltage $U_S$, the mean voltage sent by the thyratrons to the motor being thus made the higher as the divergence of position to be corrected is itself higher resulting in that the rapidity of the response of the motor is made dependent upon the amplitude of the error to be corrected. By phase shifting the voltage $U_g$ through 90° with respect to $U_A$ the control of the starting of the thyratron during all the half positive period of its anode voltage is allowed.

The present invention has for an object the increase of the accuracy of the follow-up system of the type above described, on the one hand by increasing the accuracy of response of the thyratrons, owing to a special mode of production of the control impulses and, on the other hand, by taking into consideration not only the intensity of the error signal but also its speed of variation during the operation of the servo-device. These features allow the adjustment of the error for a variation of the error signal to be made more precise and also allow the motion, when the adjustment is initiated, to be braked so as not to pass beyond the position of balance required.

The follow-up system of the present invention is characterized in that the impulses controlling the grids of the thyratrons are produced in vacuum tubes, the grids of which receive, on the one hand, an alternating voltage suitably phase-shifted with respect to the anode voltage of the thyratrons, and on the other hand a varying direct voltage supplied by a voltage resulting from the direct amplification of the error signal and by a voltage representing the rate of change of said signal, a voltage limiter being arranged in the input circuit of the vacuum tubes controlling the thyratrons to prevent these vacuum tubes from being saturated by a too strong direct voltage.

As shown in Fig. 1, the direct error signal supplied by the shifting of the sliders of the potentiometers 2 and 3 is applied to the input terminals $m$, $n$ (see Figure 3) of a push-pull amplifier, of the resistance type, constituted by the two pentodes 10, 10' supplying two pairs of potentiometers 11, 11' and 12, 12' symmetrically mounted in parallel in the output circuit of the amplifier. The potentiometers 11, 11' supply an amplified voltage representing the error signal whereas, to obtain a voltage representing the rate of change of this signal, the potentiometers 12, 12' control a second push-pull amplifier 13, 13' the output circuit of which includes a transformer 14 with two secondaries 15, 15' in which the amplified voltage representing the rate of change of the error signal is obtained. The corresponding terminals of these secondaries 15, 15' are respectively connected to the sliders of the potentiometers 11, 11' so that, finally, the voltage transmitted by 15, 15' represents the algebraic sum of the amplified error signal and of its rate of change.

Assuming that the error signal formed by the voltage supplied to the input terminals $m$, $n$ is represented in function of time $t$ by the line $e_s$ (Fig. 3a), the voltage supplied after amplification in the tubes 10, 10' across potentiometers 11, 11' will be represented by $E_s$ (Fig. 3b), whereas the amplification in tubes 13, 13' results in the rate signal represented by the curve $$\frac{dE_s}{dt}$$

(Fig. 3c). Finally, the secondary windings 15, 15' will supply a voltage equal to the sum of both said amplified voltages and represented by the curve $$V_s = E_s + \frac{dE_s}{dt}$$

in Fig. 3d.

The voltages thus obtain in the secondaries 15, 15' control the stage intended to produce the impulses of control of the thyratrons, constituted by two push-pull vacuum tube amplifiers 16, 16' and 17, 17'. To this end, the secondaries 15, 15' are respectively connected to the middle points of the secondaries of the transformers 18, 18', the primaries of which are supplied with an alternating voltage having the same frequency as the voltage supplying the anodes of the thyratrons. These secondary windings of the transformers 18, 18' control, respectively, in opposition the control grids of the tubes 16—16' and 17—17', through phase shifting circuits, with resistance and capacity networks 19, 19' being intended to suitably dephase the alternating voltage as above explained. In their output circuits, the amplifiers 16—16' and 17—17' include transformers 20—20', 21—21' delivering in the resistances 22—22', 23—23', connected to the terminals p, q, r, s which are connected to the control grids of the thyratrons 7, 8, 7', 8' respectively (Fig. 1.)

The control grids of tubes 16, 16', 17 and 17' being suitably biased by a negative voltage $V_g$ (Fig. 3e) the A. C. grid voltage phase-shifted with respect to the anode $V_a$ does not reach the threshold beyond which the tubes are made conductive, so said positive impulses are not normally generated in the output circuit thereof in the absence of the error signal. When however the amplified direct voltage $V_s$ (Fig. 3d) is supplied to the control grids of tubes 16, 16', 17, 17', the grid voltage $V_g + V_s$ (Fig. 3e) is made less negative and impulses represented by the hatched area in Fig. 3e are generated in the output of said tubes. Accordingly impulses $U_g$ (Fig. 3f) are supplied to the control grids of thyratrons 7, 8, 7', 8' causing positive impulses represented by the hatched part of the anode voltage curve $U_a$ to be supplied to the windings 9, 9' of motor 4, the mean value of the voltage supplied to said motor depending upon the duration of said impulses $U_a$, i. e. upon the value of the sum of the error voltage and of the rate voltage $V_s$, so that the servo-member driven by motor 4 follows the displacement of the control member with an increased accuracy.

A potentiometer 24 mounted in the circuit of the cathodes of the tubes 16, 16', 17, 17' makes it possible to adjust the working point of these tubes so that weak impulses are produced even in the absence of an error signal. As the two groups of thyratrons receive impulses and feed with equal voltages the two windings 9, 9' of the motor 4, the position of balance of this motor is rendered more stable. Furthermore, and particularly as soon as an error signal appears, the amplitude of the impulses imparted to one of the two groups of thyratrons increases, whereas the amplitude of the impulses imparted to the other group of thyratrons decreases and this differential effect increases the sensitiveness of the servo-device.

It is important, in event the direct voltage resulting from the amplification of the error signal becoming too high, to prevent the tubes 16, 16', 17, 17' of the generator of impulses from becoming saturated, with the paradoxical result of bringing the servo-device to a standstill when, on the contrary, it ought to obey with increased speed. To meet this drawback, according to the invention, a voltage limiter is provided at the input of the amplifier-generator of impulses 16, 17. This voltage limiter is constituted by two rectifying valves 25, 25' symmetrically mounted in the input circuit, the cathodes of said valves receiving from the potentiometer 26 a positive biassing voltage having a value equal to the limiting voltage. Under these conditions, as long as the voltage of the error signal does not reach the limiting value, the two valves do not pass any current but, as soon as the voltage exceeds this limit, the two valves become conductive and allow only the admissible voltage to pass to the grids of the generator of impulses.

The direct supply voltage of the potentiometers 2, 3 is produced, as shown in Fig. 4, by a double rectifying diode 27, fed with alternating current by several transformers with screens in series, the potentials of said screens being suitably selected to avoid starting of oscillations. For instance, as shown in the figure, the screen 29 of the first transformer is earthed and the screen 31 of the second transformer is connected to the negative of the supply of the direct current amplifier. The rectified voltage is separated from the alternating components by means of a filter 32, in the usual way.

What I claim is:

1. A servomechanism comprising a movable control member, a servo-member, an electric motor for driving the said servo-member, a plurality of thyratrons for energizing said motor, means to apply to the anodes of the thyratrons an alternating voltage, two potentiometers mounted in parallel with one another and having sliders respectively controlled by the said control member and by the said servo-member, a source of a continuous voltage supplying the two potentiometers, means to amplify the error signal difference of potential existing between the sliders of said two potentiometers, means for controlling the said thyratrons by this error signal comprising means to obtain a voltage representing the rate of change of said signal when it varies, a plurality of vacuum tubes, first means for applying to the grids of said tubes an alternating voltage having the same frequency as the voltage applied to the anodes of the thyratrons but dephased from said voltage, second means for applying to the grids of said tubes the sum of the amplified error signal and of its rate of change function, means to apply to the grids of the thyratrons the impulses produced in the output circuits of the said vacuum tubes, and a voltage limiter in the input circuit of the said vacuum tubes to prevent their saturation by the amplified error signal.

2. A servomechanism comprising a movable control member, a servo-member, an electric motor for driving the said servo-member, a plurality of thyratrons for energizing said motor, means to apply to the anodes of the thyratrons an alternating voltage, two potentiometers mounted in parallel with one another and having sliders respectively controlled by the said control member and by the said servo-member, a source of a continuous voltage supplying the two potentiometers, means to amplify the error signal difference of potential existing between the sliders of said two potentiometers, means for controlling the said thyratrons by this error signal comprising a first push-pull amplifier to the input of which is applied the said errer signal, two pairs of potentiometers symmetrically connected to the output circuit of the said first amplifier, a second push-pull amplifier to the input of which the potentiometers of a first of said pairs are connected, a very low frequency transformer mounted in the output circuit of the said second amplifier and comprising two secondaries to which are respectively connected the potentiometers of the second of said pairs, a generator of impulses comprising a plurality of vacuum tubes, means for applying to the grids of said tubes an alternating voltage having the same frequency as the voltage applied to the anodes of the thyratrons but dephased from said voltage, and means for also applying to the grids of said tubes the voltages supplied by the said secondaries of the output transformer of the said second amplifier, means to apply to the grids of the thyratrons the impulses thus generated in the output circuits of the said vacuum tubes, and a voltage limiter in the input circuit of the said vacuum tubes to prevent their saturation by the amplified error signal.

3. The combination of claim 2 wherein the said generator of impulses comprises two push-pull amplifiers each including an input circuit provided with a further transformer, means applying an alternating voltage to the primary of said further transformer, the secondary of said further transformer having a middle point connected to one of the secondaries of the output transformer of the said second amplifier, and a dephasing network connected across the secondary of the said further transformer, the output circuit of each amplifier of the said generator of impulses comprising a still further transformer having its secondary connected to the grids of two thyratrons mounted as full-wave rectifiers.

4. The combination of claim 3 including two rectifying valves symmetrically mounted between the input circuits of the two amplifiers of the generator of impulses, and means for applying to the cathodes of the said rectifying valves positive polarisation voltages the value of which is selected so that said valves become conductive when the amplified error signal reaches a value sufficient to saturate the said amplifiers.

5. The combination of claim 3 including means to adjust the working point of the tubes of the generator of impulses so that the said generator produces weak impulses in the absence of an applied error signal.

6. The combination of claim 1 comprising a source of alternating voltage for the energization of the said two potentiometers controlled by the control member and the servo-member, a plurality of series connected transformers energized by said source, said transformers including shields, means to apply to said shields suitable potentials thereby to prevent the start of oscillations, a rectifier coupled to said transformers, and filters coupled to said rectifier.

References Cited in the file of this patent
UNITED STATES PATENTS

| | | |
|---|---|---|
| 2,422,687 | Lillienthal | June 24, 1947 |
| 2,445,773 | Frost | July 27, 1948 |

OTHER REFERENCES

Electronics in Industry, Chute, first edition, page 101, Fig. 15h, page 102, McGraw-Hill, 1946.